United States Patent [19]

Goseberg

[11] Patent Number: 5,751,205
[45] Date of Patent: May 12, 1998

[54] HIGH-VOLTAGE TRANSFORMER FOR A TELEVISION RECEIVER

[75] Inventor: Walter Goseberg, Hanover, Germany

[73] Assignee: Deutsche Thomson Brandt GmbH, Villingen-Schwenningen, Germany

[21] Appl. No.: 602,181

[22] Filed: Feb. 15, 1996

[30] Foreign Application Priority Data

Feb. 27, 1995 [DE] Germany .................. 195 06 719.3
Nov. 23, 1995 [DE] Germany .................. 195 43 673.3

[51] Int. Cl.$^6$ .............. H01F 17/06; H01F 27/28; H01F 21/08
[52] U.S. Cl. .............. 336/178; 336/181; 336/165; 336/170
[58] Field of Search .............. 336/178, 171, 336/170, 165, 181

[56] References Cited

U.S. PATENT DOCUMENTS

| | | | |
|---|---|---|---|
| 2,825,849 | 4/1958 | Lufkin et al. | 315/27 |
| 3,886,634 | 6/1975 | Schreiner | 321/27 R |
| 4,229,786 | 10/1980 | Mitani et al. | 363/126 |
| 4,639,706 | 1/1987 | Shimiau | 336/170 |

FOREIGN PATENT DOCUMENTS

| | | | |
|---|---|---|---|
| 0351583 | 6/1989 | European Pat. Off. | H01F 17/04 |
| 0584497 | 7/1993 | European Pat. Off. | H04N 3/195 |
| 1904757 | 8/1970 | Germany . | |
| 2602668 | 7/1977 | Germany | 336/213 |
| 3900286 | 1/1989 | Germany | H01F 27/24 |

OTHER PUBLICATIONS

EPO Search report.

*Primary Examiner*—J. R. Scott
*Assistant Examiner*—Anh Mai
*Attorney, Agent, or Firm*—Joseph A. Tripoli; Frederick A. Wein

[57] ABSTRACT

A transformer to achieve a precise amplitude for the operating voltages produced by the auxiliary windings, and such that the construction and production of the transformer are simplified. An auxiliary winding is split into a plurality of winding elements disposed in different chambers of a chamber-type coil former. One of the chambers is disposed in the region of the air gap of a U/I core or of a U/U core, the two U-core halves having parallel limbs of different lengths.

7 Claims, 4 Drawing Sheets

HIGH-VOLTAGE TRANSFORMER FOR A TELEVISION RECEIVER

BACKGROUND

The invention is based on a high-voltage transformer for a television receiver. The auxiliary windings are used to produce additional operating voltages, for example for a video amplifier, the heating of a cathode ray tube, other bias voltages or pulses for phase comparison circuits. The amplitude of the operating voltage produced by an auxiliary winding must in many cases be kept particularly accurate, especially in the case of the voltage for heating the cathode ray tube. This precise maintenance of the amplitude in practice often results in difficulties if the number of turns of an auxiliary winding is small. In this case, for example, three turns produce an operating voltage which is too small, and even four turns produce an operating voltage which is too high. The degrees of freedom for achieving an operating voltage with a desired amplitude are thus relatively limited in the case of such a transformer.

SUMMARY OF THE INVENTION

The invention is based on the object of designing the high-voltage transformer such that, without any additional outlay such as stabilization circuits for example, the respectively desired amplitude of the operating voltage produced by the auxiliary winding can be maintained with sufficient accuracy. In addition, the production and construction of the entire high-voltage transformer are simplified by the invention.

The invention comprises the following features:

a. The auxiliary winding is split into a plurality of winding elements which are located in different chambers of a chamber-type coil former.

b. One of the chambers is located in the region of the air gap of a U/I core or of a U/U core, the two U-core halves having parallel limbs of considerably different lengths.

The invention is based on the following knowledge. A winding element in a chamber which is located above the air gap has a significantly lower degree of coupling than a winding element outside the region of the air gap. If a winding element in a chamber outside the air gap, with a high degree of coupling, and a winding element in a chamber above the air gap, with a lower degree of coupling, are now connected in series, the amount of versatility in the amplitude of the operating voltage produced by the series circuit formed by the winding elements is increased. An operating voltage can then be maintained with an accuracy of about 100 mV. If the auxiliary windings are wound continuously, the number of connecting pins on the high-voltage transformer, the so-called pins, is thus also reduced. In addition, the circulating currents are reduced by the defined position of the winding elements in separate chambers in the case of a winding having a plurality of parallel-wound wires.

The winding elements can also be located in more than two separate chambers, some of which are then located outside the region of the air gap and have a high degree of coupling, while others are located above the air gap or in the vicinity of the air gap and have a considerably lower degree of coupling.

The auxiliary winding and/or the primary winding of the transformer are preferably wound using stranded wires, it being possible for the winding to comprise a plurality of wires which are twisted with a short pitch. Winding elements of an auxiliary winding can also be wound in opposite winding directions.

A development of the invention comprises the following: it is known for the operating voltage for the video amplifier to be obtained by rectification of the pulsed voltage at the high-voltage transformer. The rectifier for the production of this operating voltage is switched on briefly by the line flyback pulse during its pulse peak, in order to recharge the energy storage capacitor of the rectifier circuit. In this case, relatively sudden and hard switching-on and switching-off occur at the start and end, respectively, of the pulse peak. These hard switching shocks cause the high-voltage voltage winding to be excited to oscillate, in an undesirable manner, at its resonant frequency or frequencies. This results in an undesirable influence on the high voltage, in particular leading to an increase in the internal impedance. In addition, undesirably high voltage spikes can in consequence occur on the switching transistor in the line output stage. Such undesirable current surges can be reduced by a resistor or an inductance in series with the rectifier of the rectifier circuit. However, such additional components are expensive because of the relatively high currents. According to the said development, an auxiliary winding for producing the operating voltage for the video amplifier is located in a chamber of the high-voltage transformer in the region of the air gap, so that the degree of coupling is considerably less than the degree of coupling of the chamber containing the primary winding and high-voltage winding. The lower degree of coupling means increased stray inductance. In the equivalent circuit, this stray inductance is located in series with the rectifier for producing the operating voltage for the video amplifier, and thus reduces undesirable current surges. The increased stray inductance, formed by the reduced degree of coupling, of the auxiliary winding in the chamber above the air gap is thus used in an advantageous manner to reduce the undesirable influence of the rectifier circuit for producing the operating voltage for the video amplifier on the high-voltage transformer, without any additional components. The said auxiliary winding is preferably located in a chamber at the end of the coil former, in the region of the air gap of the core.

BRIEF DESCRIPTION OF THE DRAWINGS

The invention is explained in the following text with reference to the drawing, in which.

DESCRIPTION OF THE PREFERRED EMBODIMENTS

Figure 1:
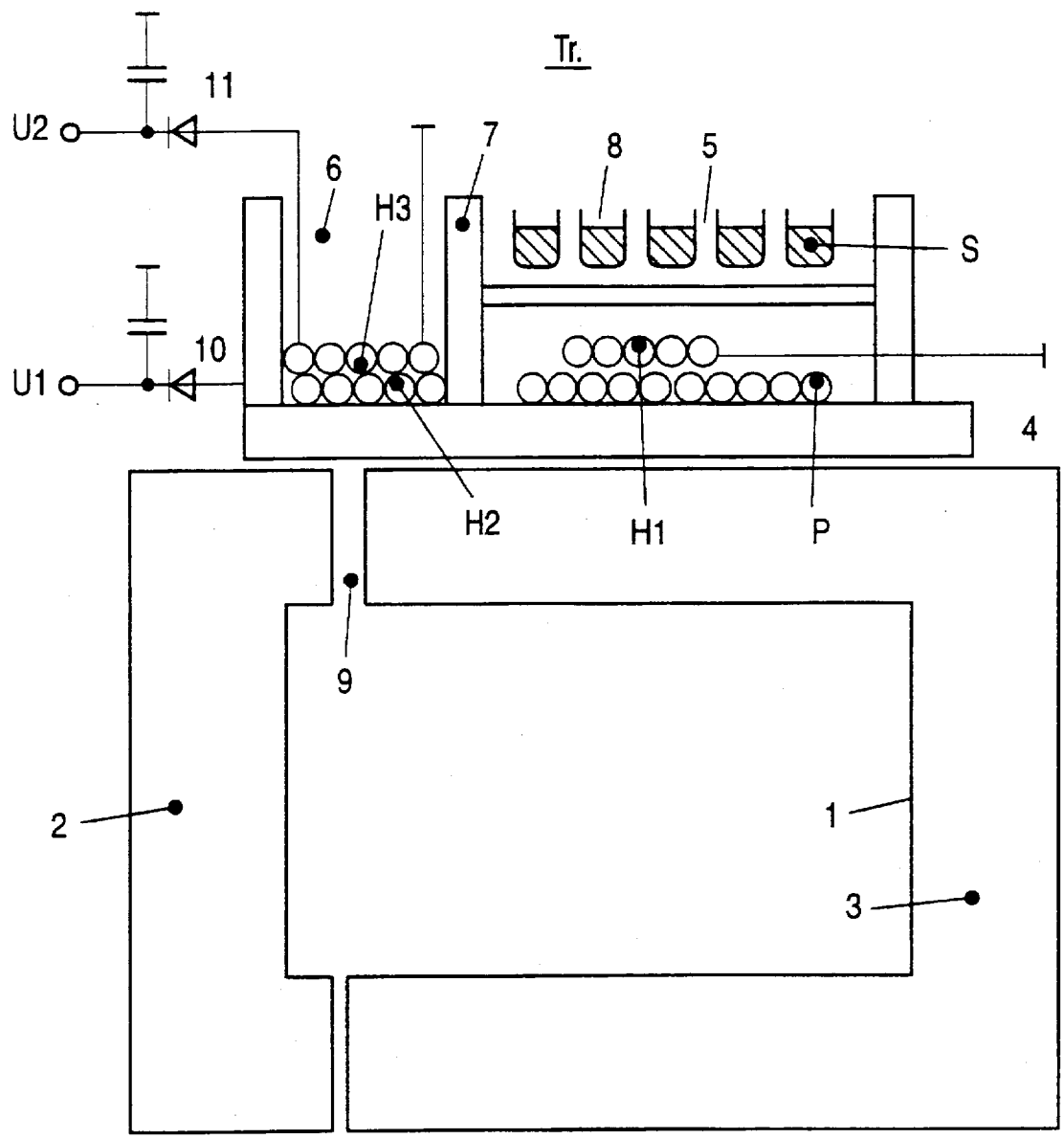
FIG. 1 shows the construction of a high-voltage transformer according to the invention for a television receiver.

FIG. 1 shows the high-voltage transformer Tr for producing the high voltage in a television receiver. The illustration shows the ferrite core 1 having an I-shaped core half 2 and a U-shaped core half 3 as well as a coil former 4 having two chambers 5, 6, which are located side by side in the axial direction and are separated from one another by a chamber wall 7. The primary winding P is located on the base of the chamber 5, and the winding element Hi of an auxiliary winding is located above said primary winding P. Winding elements S of the high-voltage winding, which are connected on the basis of the diode-split principle, are located in a large number of narrow chambers 8.

A second winding element H2 of the auxiliary winding H, which is connected in series with the first winding element H1, is located in the chamber 6, which is located above the air gap 9 of the core 1 between the core halves 2, 3. The series circuit formed by the winding elements H1, H2 supplies, via the rectifier circuit 10, an operating voltage U1, for example the heating voltage for the cathode ray tube, an operating voltage for an amplifier or the like. Located in the chamber 6 is a second auxiliary winding H3, which supplies, via the rectifier circuit 11, an operating voltage U2 for the video-signal amplifier of the television receiver.

As a result of the fact that the chamber 6 is located with the windings H2 and H3 above the air gap 9, the degree of coupling is considerably less than in the chamber 5, because of the greater scattering of the magnetic flux there. The described very large number of amplitudes for the operating voltage U1 can be achieved by the different degrees of coupling for the winding elements H1 and H2. As described, the interfering influence of the rectifier circuit 11 on the high voltage is considerably reduced by the likewise lower degree of coupling for the winding H3.

Figure 2:
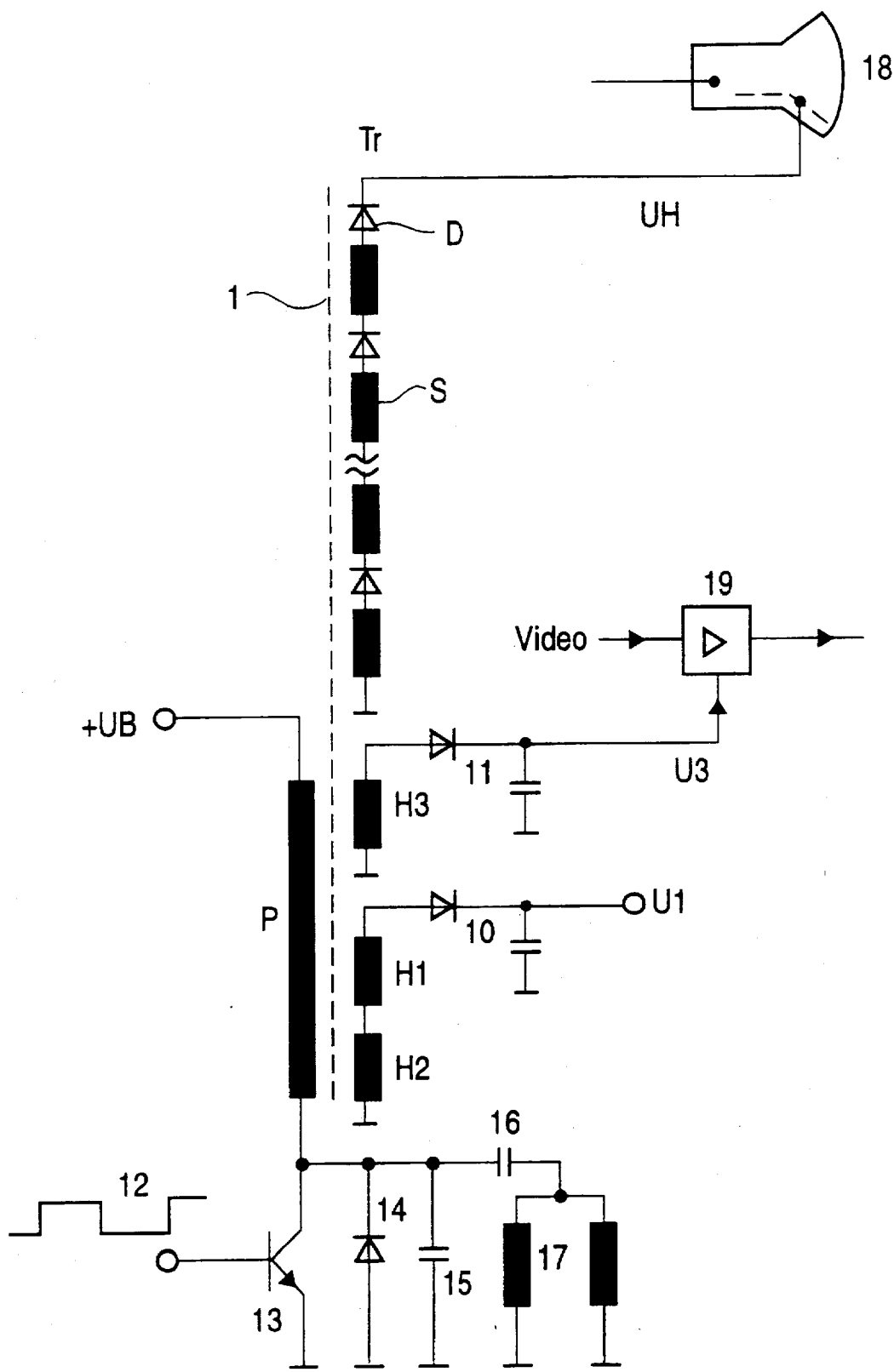
FIG. 2 shows the circuit diagram for the transformer illustrated in FIG. 1.

FIG. 2 shows the construction of the line output stage with the transformer Tr according to FIG. 1. The illustration shows the switching transistor 13, which is controlled by the line-frequency switching voltage 12, the flyback diode 14, the flyback capacitor 15, the coupling or tangent capacitor 16, the line deflection coils 17, the primary winding P, which is connected to an operating voltage +UB, of the transformer Tr, the winding elements H1, H2, the rectifier circuit 10, the auxiliary winding H3, the rectifier circuit 11, four winding elements S of the high-voltage winding between each of which there are located diodes D connected in the same sense, and the cathode ray tube 18 which is supplied with the high voltage UH produced.

The operating voltage U2 which is produced by the auxiliary winding H3 and the rectifier circuit 11 is supplied as the operating voltage to the video amplifier 19 in the path of the video signal. As a result of its geometric position according to FIG. 1, the winding element H2 has a considerably lower degree of coupling than the winding element H1, as a result of which the wide versatility of the achievable amplitude levels for the voltage U1 is achieved.

In the case of the described transformer, it is known for the high-voltage winding to be tuned to odd-numbered harmonics, in particular the 9th, 11th, 13th and 15th harmonics of the frequency of the flyback oscillation. This tuning allows the form of the flyback pulse, which is used to produce the high voltage, on the high-voltage winding to be influenced and the internal impedance of the high-voltage source to be reduced.

Harmonics of the fundamental of the flyback oscillation are produced in the flyback pulse at the transformer, in particular on the high-voltage winding, as a result of this tuning. The ideal pulse in the form of a sinusoidal half-cycle during the flyback in this case has superimposed on it interference oscillations, for example in the range from 200–500 kHz, both during the flyback and during the forward sweep. These interference oscillations increase the power loss of the transformer, can cause interference radiation and thus an adverse effect on adjacent circuits, increase the internal impedance of the high-voltage source and also cause interference patterns in the picture, in the form of so-called "curtains". It is thus necessary to damp or attenuate these interference oscillations, which are also called "ringing".

Another development of the invention is based on the object of designing the high-voltage transformer without any additional means in structural terms, such that these interference oscillations are sufficiently damped or attenuated. This object is achieved by the development specified in claim 8. Advantageous refinements of this development are specified in claims 9–10.

Thus according to this development, a first auxiliary winding is arranged in the first chamber and the second auxiliary winding is arranged in the second chamber, and their numbers of turns are designed such that the amplitudes of the fundamentals of the flyback pulse produced in the two auxiliary windings are of approximately the same magnitude. The development is based on the following knowledge and considerations. The first auxiliary winding, which is located together with the primary winding in the same chamber in the coil former, is closely coupled to the primary winding as a result of the fact that it is located close to it. The flyback pulse does not have the said interference oscillations superimposed on it at the primary winding, because these interference oscillations are produced in the high-voltage winding and are suppressed in the primary circuit during the forward sweep by the so-called flyback diode, which is connected in parallel with the switching transistor and is forward-biased during the forward sweep. Only the fundamental of the flyback pulse is present, therefore, on the primary winding and on the first auxiliary winding, without the interference oscillations, that is to say a pure wanted signal.

However, the second auxiliary winding in the second chamber is considerably further away from the primary winding and thus has a considerably lower degree of coupling to the primary winding. As a result of its coupling to the high-voltage winding, the said interference oscillations are produced, in similar form to that on the high-voltage winding itself, on this second auxiliary winding. The flyback pulse on this second auxiliary winding thus has the said interference oscillations superimposed on it. This now has the following advantageous effect:

By appropriate selection of the number of turns on the first auxiliary winding and the second auxiliary winding, the fundamental of the flyback pulse, that is to say the half-sine wave, has the same amplitude on the first auxiliary winding and on the second auxiliary winding, and also occurs at the same time. Thus, for the fundamental, no circulating current flows in the parallel circuit formed by the two auxiliary windings, in a desirable manner. This is also desirable because this half sine wave, which can be regarded as the wanted signal, is not intended to be damped or attenuated.

The said interference oscillations in the meantime are not present in the flyback pulse on the first auxiliary winding but are present in the flyback pulse in the second auxiliary winding. The parallel circuit formed by the two auxiliary windings thus results in circulating currents only for these interference oscillations, that is to say in the higher frequency range above about 50 kHz. These circulating currents are therefore desirable and produce the desired damping or attenuation of the interference oscillations on the high-voltage transformer.

In the case of the development, the desired damping or attenuation of the interference oscillations is thus achieved without any additional means, namely only as a result of a special arrangement and design of the two auxiliary windings. The auxiliary windings thus carry out two tasks in an advantageous manner, without any additional outlay, namely the production of an operating voltage or pulsed voltage, and the damping or attenuation of the interference oscillations.

The number of turns of the second auxiliary winding in the second chamber is preferably somewhat greater than the number of turns of the first auxiliary winding in the first chamber. This is generally necessary in order to achieve the same amplitude of the fundamental of the flyback pulses in the two auxiliary windings, despite the lower degree of coupling in the second chamber.

The number of turns of the two auxiliary windings is roughly in the range from 6 - 30. If the number of turns becomes considerably smaller, the requirement for the same amplitude of the fundamental cannot be maintained sufficiently accurately. If the number of turns is considerably greater, the desired circulating currents in the auxiliary windings no longer have the required value to achieve sufficient damping or attenuation.

The second chamber is preferably located in the region of the air gap of the core. This is advantageous since it promotes the desired and advantageously used lower degree of coupling between the second auxiliary winding and the primary winding.

The auxiliary windings are preferably used for producing an operating voltage for an amplifier such as the IF amplifier, video amplifier or audio amplifier, for example, as a source for a pulsed voltage or else for heating the cathode ray tube.

The described development is explained in the following text with reference to FIGS. 3 - 7.

Figure 3:
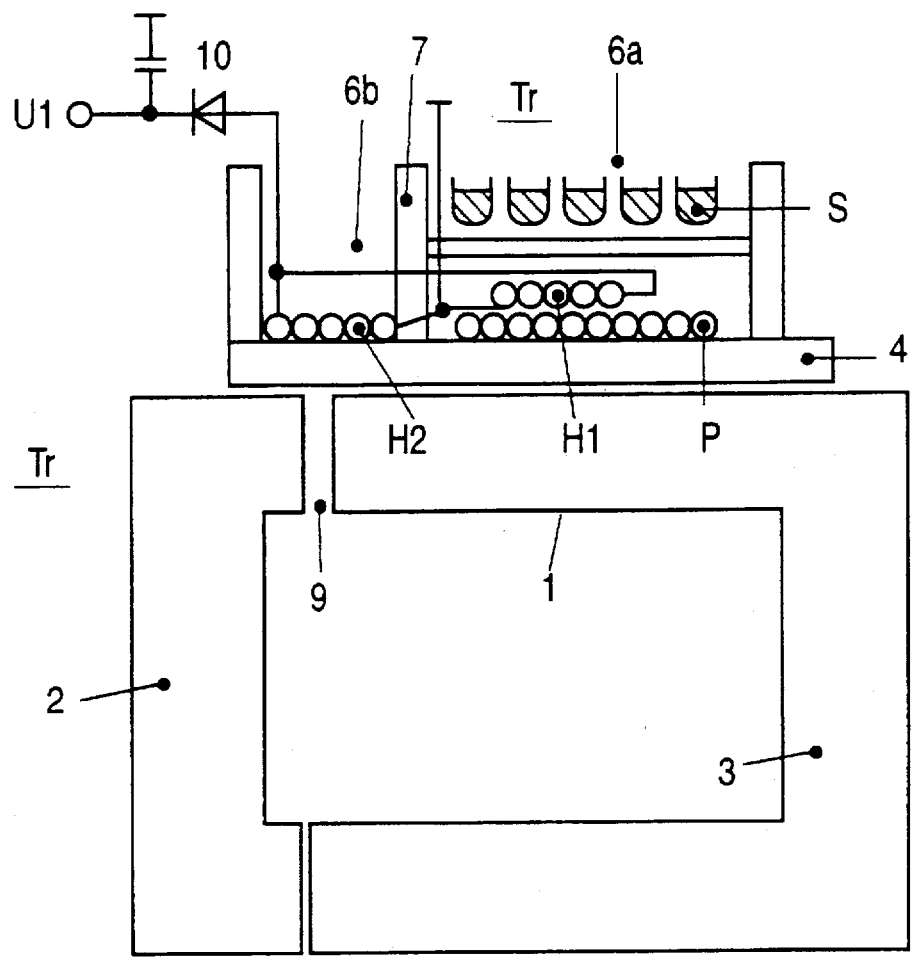
FIG. 3 shows a high voltage transformer for a television receiver according to the development.

FIG. 3 shows the construction of the high-voltage transformer Tr, in simplified form. The illustration shows the ferrite core 1 with the approximately I-shaped core half 2 and the U-shaped core half 3 as well as the air gap 9. The core 1 supports the coil former 4. The coil former 4 contains a first chamber 6a in which the primary winding P and the high-voltage winding S, which is designed as a chamber winding, are located. The coil former 4 contains a second chamber 6b, which is also called an auxiliary chamber, is axially offset with respect to the first chamber 6a and is located in the region of the air gap 9.

In addition, the coil former 4 contains two auxiliary windings Hi and H2, which are connected in parallel and supply, via the rectifier circuit 10, an operating voltage U1, for example for the IF amplifier, the video amplifier, the audio amplifier, a pulsed voltage for a synchronization circuit or else the heating voltage for the cathode ray tube.

Figure 4:
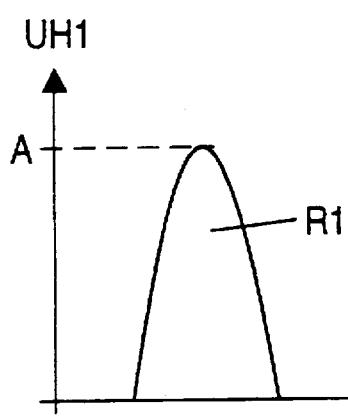
FIGS. 4, 5 show the flyback pulse, for the first auxiliary winding and the second auxiliary winding respectively.
Figure 5:
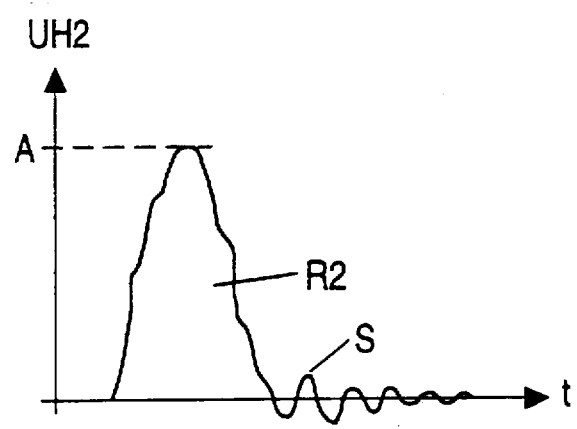

The additional effect of the auxiliary windings H1 and H2 for damping or attenuating the interference oscillations is explained with reference to FIGS. 4 and 5. By virtue of its position immediately above the primary winding P, the auxiliary winding H1 is closely coupled to said primary winding P, to be precise considerably more closely than to the high-voltage winding S. A flyback pulse R1, in the form of a pure half sine wave P without the said interference oscillations, is present on the primary winding P, since the interference oscillations are produced only in the high-voltage winding and are additionally suppressed on the primary winding P during the forward sweep by the flyback diode, which is connected in parallel with the switching transistor of the line output stage. Thus, as a result of the close coupling between the primary winding P and the auxiliary winding H1, the flyback pulse R1 on the auxiliary winding H1 according to FIG. 2 has no interference oscillations and the amplitude A.

Because of its axially offset position with respect to the primary winding P, the auxiliary winding H2 in the chamber 6b is considerably less closely coupled to the primary winding P, but is significantly coupled to the high-voltage winding S. Significant interference oscillations N thus occur in the flyback pulse R2 on the auxiliary winding H2 according to FIG. 5 during the start of the flyback and during the forward sweep. The number of turns of the windings H1, H2 is selected in such a manner that the fundamental is of the same magnitude in the two flyback pulses RI, R2. This means that no circulating current flows between the auxiliary windings H1, H2 for the fundamental, that is to say the wanted signal. However, a circulating current flows for the interference oscillations N, because these interference oscillations are present only in the pulse R2 on the winding H2. This desirable circulating current thus produces the desired damping or attenuation of the interference oscillations N. This effect, which is advantageous for the damping or attenuation of the interference oscillations, does not have any negative influence on the operating voltage U1 because such interference oscillations are suppressed in any case, in the rectifier circuit 10.

Figure 6:
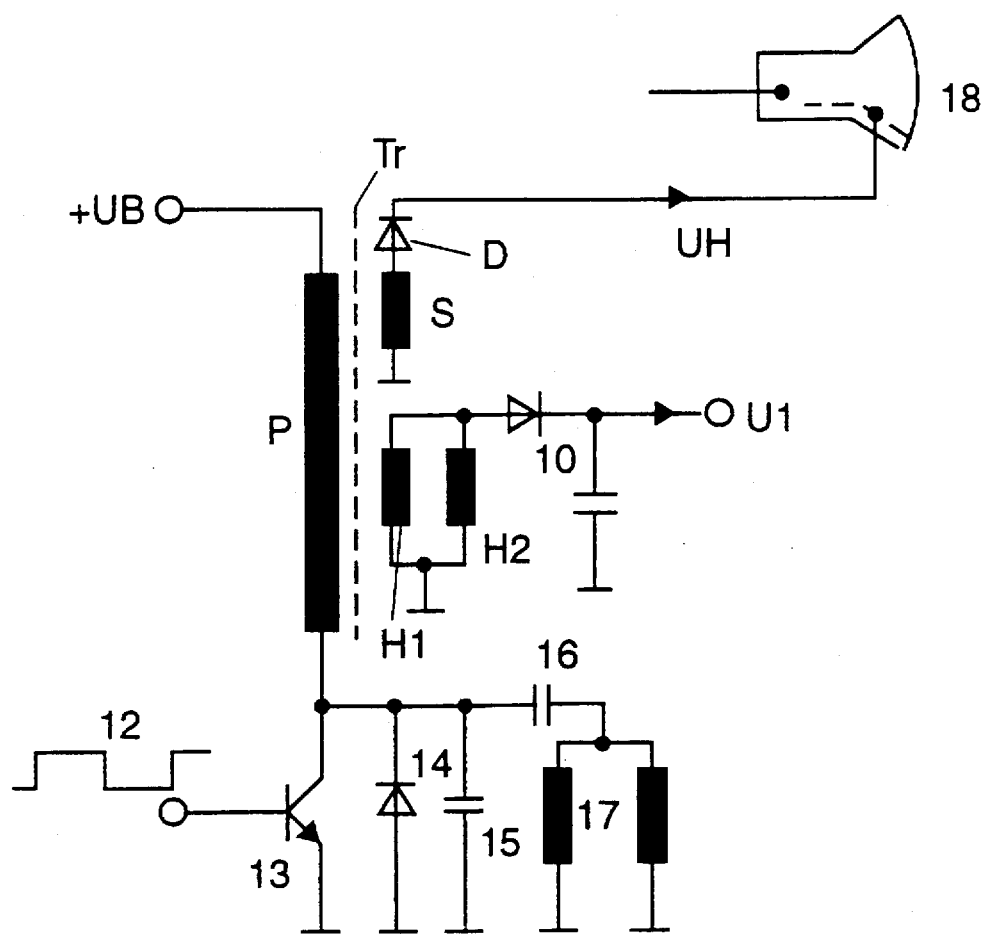
FIG. 6 shows a line deflection circuit, with high-voltage production using a transformer according to FIG. 1, and shows an equivalent circuit for the two auxiliary windings.

FIG. 6 shows a line deflection circuit in which the high voltage is obtained using a transformer Tr according to FIG. 3. The illustration shows the switching transistor 13 which is controlled by the line-frequency switching voltage 12, the flyback diode 14, the flyback capacitor 15, the coupling or tangent capacitor 16, the line deflection coils 17, the primary winding P, which is connected to an operating voltage +UB, of the transformer Tr, the auxiliary windings H1, H2, the rectifier circuit 10 for producing the operating voltage U1, the high-voltage winding S and the high-voltage rectifier D for producing the high voltage UH for the cathode ray tube 18. The two parallel-connected auxiliary windings H1 and H2 are used for producing the operating voltage U1 and for damping or attenuating the described interference oscillations N.

Figure 7:
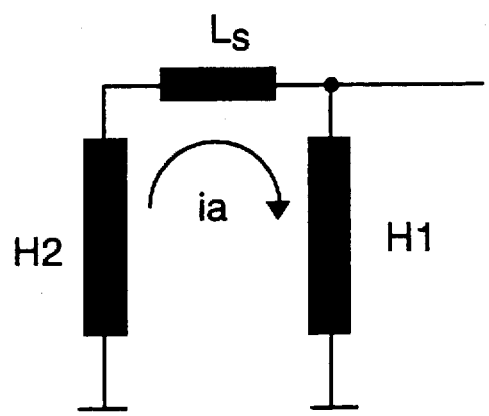
FIG. 7 shows an equivalent circuit for the two auxiliary windings.

FIG. 7 shows an equivalent circuit for the auxiliary windings H1, H2. The stray inductance Ls acts between the windings H1, H2 because of the relatively loose coupling between these two windings. The stray inductance Ls makes it possible for the interference oscillations N to be present on the auxiliary winding H2, but not on the auxiliary winding H1. The described effect can be achieved by special selection of the numbers of turns for H1 and H2. If the numbers of turns are too small, it is difficult to comply with the requirement for the same amplitude A of the fundamental of the flyback pulses R1, R2. If the number of turns is too great, the value of Ls becomes too high, so that the circulating currents ia, which are produced and are desirable, do not have a sufficient amplitude to damp or attenuate the interference oscillations N. In practice, the said requirements can be achieved with a number of turns between 6 and 30 for H1 and H2.

I claim:

1. High-voltage transformer for a television receiver comprising:

a core a primary winding, a high-voltage winding, an auxiliary winding, the windings being located in a plurality of chambers located side by side in the axial direction of the core the auxiliary winding being split into a plurality of winding elements which are connected in series and which are located in different chambers, one of the chambers being located in the region of the air gap of a U/I core or of a U/U core and having less coupling, the numbers of turns of said winding elements being chosen and distributed in both chambers so that the required operating voltage is precisely produced.

2. Transformer according to claim 1, wherein the winding elements are located in more than two separate chambers.

3. Transformer according to claim 1, wherein winding elements of an auxiliary winding are wound in opposite winding directions.

4. Transformer according to claim 1, wherein the winding comprises a plurality of wires.

5. High-voltage transformer for a television receiver comprising:

a core;

a coil former surrounding the core, the coil former having a first chamber with a primary winding and a high-voltage winding located above it, and having a second chamber which is offset axially with respect to the first chamber, and having two parallel-connected auxiliary windings to produce an operating voltage or pulsed voltage, the first auxiliary winding being located in the first chamber and closely coupled to the primary winding the second auxiliary winding being located in the second chamber lying separately in the region of an air gap of the core and coupled to the high voltage winding, the numbers of turns of the auxiliary windings being determined for providing means for amplitudes of the fundamentals of a flyback pulse produced in the two auxiliary windings being approximately the same magnitude.

6. Transformer according to claim 5, wherein the number of turns of the second auxiliary winding is greater than the number of turns of the first auxiliary winding.

7. Transformer according to claim 5, wherein the number of turns of each auxiliary winding is approximately in the range from 6 to 30.

* * * * *